United States Patent
Kleindl et al.

(10) Patent No.: US 10,054,092 B2
(45) Date of Patent: Aug. 21, 2018

(54) VALVE DEVICE

(71) Applicant: Robert Bosch GmbH, Stuttgart (DE)

(72) Inventors: Michael Kleindl, Schwieberdingen (DE); Tamim Latif, Tokyo (JP); Michael Spitznagel, Seitingen-Oberflacht (DE); Matthias Maess, Boeblingen (DE); Dominik Brunner, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 14/443,748

(22) PCT Filed: Oct. 7, 2013

(86) PCT No.: PCT/EP2013/070762
§ 371 (c)(1),
(2) Date: May 19, 2015

(87) PCT Pub. No.: WO2014/079623
PCT Pub. Date: May 30, 2014

(65) Prior Publication Data
US 2015/0300303 A1    Oct. 22, 2015

(30) Foreign Application Priority Data

Nov. 26, 2012   (DE) .................. 10 2012 221 540

(51) Int. Cl.
*F01L 3/00*    (2006.01)
*F02M 59/46*   (2006.01)
(Continued)

(52) U.S. Cl.
CPC ...... *F02M 59/462* (2013.01); *F02M 63/0077* (2013.01); *F16K 47/08* (2013.01)

(58) Field of Classification Search
CPC ..... F02M 63/0054; F02M 59/442; F16K 1/42
(Continued)

(56) References Cited

U.S. PATENT DOCUMENTS

| | | | |
|---|---|---|---|
| 2,797,704 A * | 7/1957 | McDermott .......... | F16K 15/063 137/543.19 |
| 3,086,544 A * | 4/1963 | Yost ...................... | B60K 25/04 137/315.33 |

(Continued)

FOREIGN PATENT DOCUMENTS

| CN | 101135283 A | 3/2008 |
|---|---|---|
| DE | 10 2011 004 993 A1 | 9/2012 |

(Continued)

OTHER PUBLICATIONS

International Search Report corresponding to PCT Application No. PCT/EP2013/070762, dated Nov. 29, 2013 (German and English language document) (5 pages).

*Primary Examiner* — Marguerite McMahon
*Assistant Examiner* — James Kim
(74) *Attorney, Agent, or Firm* — Maginot, Moore & Beck LLP

(57) ABSTRACT

A valve device includes a housing, a flow duct and a valve body. The valve body is arranged in the flow duct and has a sealing section that bears against a housing-side sealing seat when the valve device is closed. The sealing section and the sealing seat together form a sealing region. There is a collapse zone immediately upstream of the sealing region in the flow duct when the valve device is closed. The collapse zone is delimited by a boundary wall that is at least substantially perpendicular with respect to a movement axis of the valve body and by a deflector wall that is arranged at an angle with respect to the boundary wall. The boundary wall is longer than the deflector wall.

16 Claims, 2 Drawing Sheets

(51) Int. Cl.
*F02M 63/00* (2006.01)
*F16K 47/08* (2006.01)

(58) Field of Classification Search
USPC .................. 123/188.8; 137/535; 239/585.4
See application file for complete search history.

(56) References Cited

U.S. PATENT DOCUMENTS

| | | | | |
|---|---|---|---|---|
| 5,623,957 | A * | 4/1997 | Lekholm | A61M 5/14216 |
| | | | | 137/246 |
| 5,692,539 | A * | 12/1997 | Pickl, Jr. | F16K 15/028 |
| | | | | 137/543.19 |
| 6,378,502 | B1 * | 4/2002 | Betz | F02M 47/027 |
| | | | | 123/467 |
| 6,988,510 | B2 * | 1/2006 | Enerson | F16K 15/023 |
| | | | | 137/375 |
| 8,925,579 | B2 * | 1/2015 | Weaver | B65D 77/225 |
| | | | | 137/103 |
| 2005/0257838 | A1 * | 11/2005 | Enerson | F16K 15/023 |
| | | | | 137/528 |
| 2009/0116976 | A1 * | 5/2009 | Aritomi | F02M 63/0036 |
| | | | | 417/311 |
| 2012/0247592 | A1 * | 10/2012 | Thorwirth | F02M 59/366 |
| | | | | 137/565.01 |
| 2014/0117268 | A1 * | 5/2014 | Deponte | F02M 59/366 |
| | | | | 251/366 |
| 2015/0316013 | A1 * | 11/2015 | Kleindl | F04B 1/00 |
| | | | | 417/437 |

FOREIGN PATENT DOCUMENTS

| | | |
|---|---|---|
| DE | 10 2011 005 485 A1 | 9/2012 |
| DE | 10 2011 005 487 A1 | 9/2012 |
| JP | S49106928 U | 9/1974 |
| JP | 54-69407 U | 5/1979 |
| JP | S54-69409 U | 5/1979 |
| JP | S60-7371 U | 1/1985 |
| JP | H622669 U | 3/1994 |
| JP | H07-253170 A | 10/1995 |
| JP | H08-145216 A | 6/1996 |
| JP | 10-288266 A | 10/1998 |
| JP | 2006-29573 A | 2/2006 |
| JP | 2006-292152 A | 10/2006 |
| JP | 2009-78526 A | 4/2009 |
| JP | 2009-257437 A | 11/2009 |
| JP | 2010-144754 A | 7/2010 |
| KR | 10-0865265 A | 10/2008 |
| KR | 10-2014-0007421 A | 1/2014 |
| WO | 2012/116850 A1 | 9/2012 |

* cited by examiner

VALVE DEVICE

This application is a 35 U.S.C. § 371 National Stage Application of PCT/EP2013/070762, filed on Oct. 7, 2013, which claims the benefit of priority to Serial No. DE 10 2012 221 540.9, filed on Nov. 26, 2012 in Germany, the disclosures of which are incorporated herein by reference in their entirety.

BACKGROUND

The disclosure relates to a valve device in accordance with the following description and to a high pressure pump as described below.

Valve devices, for example outlet valves of a high pressure pump of a fuel system of an internal combustion engine, are known on the marketplace. Frequently, valve devices of this type have a valve body which can bear on a sealing section against a housing-side sealing seat and thus close the valve device. In a closed state of the valve device, pressure pulses can occur in the hydraulic lines which are connected to the valve device, as a result of which a liquid vapor ("vapor bubbles") can be produced in the region of the sealing section or the sealing seat. The implosion of said vapor bubbles results in what is called cavitation erosion on surrounding sections of the housing and/or the valve body. DE 10 2011 004 993 A1 proposes providing a quantity control valve with a decaying space, in order to protect the sealing seat and the sealing section against cavitation erosion.

Proceeding herefrom, the present disclosure is based on the object of specifying a valve device which makes further improved protection against cavitation erosion possible.

SUMMARY

The problem on which the disclosure is based is solved by way of a valve device as described below and by way of a high pressure pump as described below. Advantageous developments are specified in the description below. Features which are important for the disclosure are found, furthermore, in the following description and in the drawing, it being possible for the features to be important for the disclosure both on their own and in different combinations, without reference being made explicitly to this again.

The valve device according to the disclosure has the advantage that the resilience in the region of a sealing seat and/or a sealing section of the valve device against cavitation erosion is considerably improved. Here, the throughflow rate coefficient and the pressure drop along a flow duct, as well as the valve stroke, the valve switching time and the fatigue strength of the valve device remain substantially unchanged.

The valve device according to the disclosure is, in particular, a check valve.

The disclosure proceeds from the consideration that a high resilience to cavitation erosion in a sealing region which is formed by a sealing section and a sealing seat on one side and a high throughflow rate coefficient of the valve device on the other side can be conflicting requirements. Although it is possible to increase the throughflow rate coefficient of the valve device, with an unchanged valve stroke, by means of bevels or rounded portions which are positioned immediately upstream of the sealing region, this results in a gap of wedge-like cross section between the sealing section and the sealing seat when the valve device is closed. The bubbles in the fluid which are formed on account of cavitation effects will ultimately and therefore comparatively rapidly decay in this wedge-like gap, independently of the respective pressure, as a result of which an erosion of the sealing section and/or the sealing seat can occur.

According to the disclosure, the boundary wall is longer than the deflector wall. As a result, a breakaway edge in the form of an elongate decaying space is produced, as a result of which a fluid flow in the region of the decaying space is deflected parallel to the sealing section or to the sealing seat and completely or at least substantially completely, with the result that the entire cross section of the sealing region is flowed through. In this way, a high throughflow rate coefficient is maintained and at the same time very high protection against cavitation erosion is achieved. As a result, a valve device with a particularly long service life can be provided. Moreover, a comparatively narrow sealing seat can be provided, which improves the sealing action of the valve device and also its acoustic properties.

The boundary wall extends at least substantially perpendicularly with respect to a movement axis of the valve body. In the context of the disclosure, "substantially perpendicularly" is understood to mean, in particular, "perpendicularly in the sense of an angle of 90°", but preferably also directions of extent which differ by a maximum of ±20°, in particular by a maximum of ±10°, in relation to an angle of 90°.

In one refinement of the disclosure, the boundary wall is at least 1 mm, preferably at least 2 mm, in particular at least 3 mm longer than the deflector wall. These values allow optimum throughflow rate coefficients and high protection against cavitation erosion to be combined with one another.

The abovementioned advantages can also be achieved by virtue of the fact that the boundary wall is longer than the deflector wall by a factor of at least 1.2, in particular by a factor of at least 1.5.

Particularly satisfactory deflection of a fluid from a direction parallel to the movement axis of the valve body into a radial direction with respect hereto results if the boundary wall is annular disk-shaped and is preferably concentric with respect to the movement axis of the valve body.

A further improvement in the protection against cavitation erosion can be achieved by virtue of the fact that the deflector wall is hollow-cylindrical and is preferably concentric with respect to the movement axis of the valve body.

One particularly preferred embodiment of the disclosure provides that the sealing seat is adjoined on the side which faces away from the boundary wall by a flow guiding face which is inclined at least in sections in relation to a fluid flow direction which prevails in the sealing region when the valve device is open, and that the deflector wall, the sealing seat and the flow guiding face together form a housing-side projection. The flow guiding face makes it possible to prevent "dead water regions" which are associated with eddy formation and corresponding flow losses.

The flow guiding face can be of planar configuration or rounded and is preferably inclined in relation to the flow direction by at least 10°, preferably by at least 20°.

In order to avoid flow breakaway, it is preferred if the flow guiding face is inclined in relation to the fluid flow direction by at most 90°, preferably by at most 70°.

Further refinements provide that the valve body is of plate-shaped, cylindrical, spherical or conical configuration or that it is a double cone valve. The disclosure can advantageously be used for these geometries of the valve body or the valve device.

BRIEF DESCRIPTION OF THE DRAWINGS

In the following text, exemplary embodiments of the disclosure will be explained with reference to the drawing, in which.

DETAILED DESCRIPTION

Figure 1:
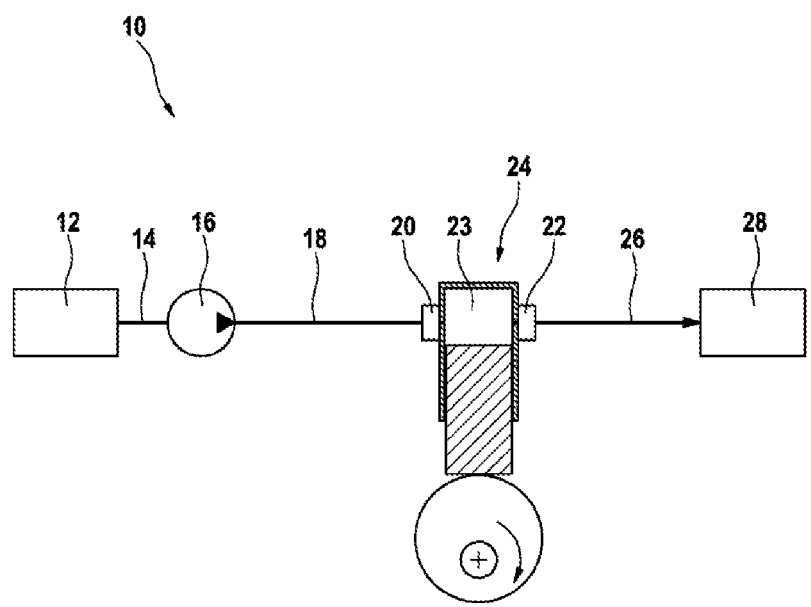
FIG. 1 shows a simplified diagram of a fuel system with a high pressure pump and a valve device.

FIG. 1 shows a fuel system 10 of an internal combustion engine in a greatly simplified illustration. Fuel is fed from a fuel tank 12 via a suction line 14, by means of a prefeed pump 16, via a low pressure line 18, and via an inlet valve 20 to a delivery space 23 of a high pressure pump 24.

The inlet valve 20 is, for example, a quantity control valve and can be actuated by an electromagnet. As an alternative to an electromagnet, a piezoelectric actuator or hydraulic actuator can also be used, for example.

The high pressure pump 24 has an outlet valve which is configured in the form of a valve device 22 which will be described in greater detail in the following text. The valve device 22 communicates via a high pressure line 26 to a high pressure accumulator 28.

During operation of the fuel system 10, the prefeed pump 16 delivers fuel from the fuel tank 12 into the low pressure line 18. Here, the inlet valve 20 determines the fuel quantity which is fed to the delivery space 23 of the high pressure pump 24.

The function of the valve device 22 consists in opening in a delivery phase of the high pressure pump 24, in order to produce a fluid connection between the delivery space 23 and the high pressure accumulator 28, in order that the high pressure accumulator 28 can be filled with pressurized fluid. In a suction phase of the high pressure pump 24, the valve device 22 closes, in order to prevent an undesired backflow of fluid out of the high pressure accumulator 28 into the delivery space 23.

Figure 2:
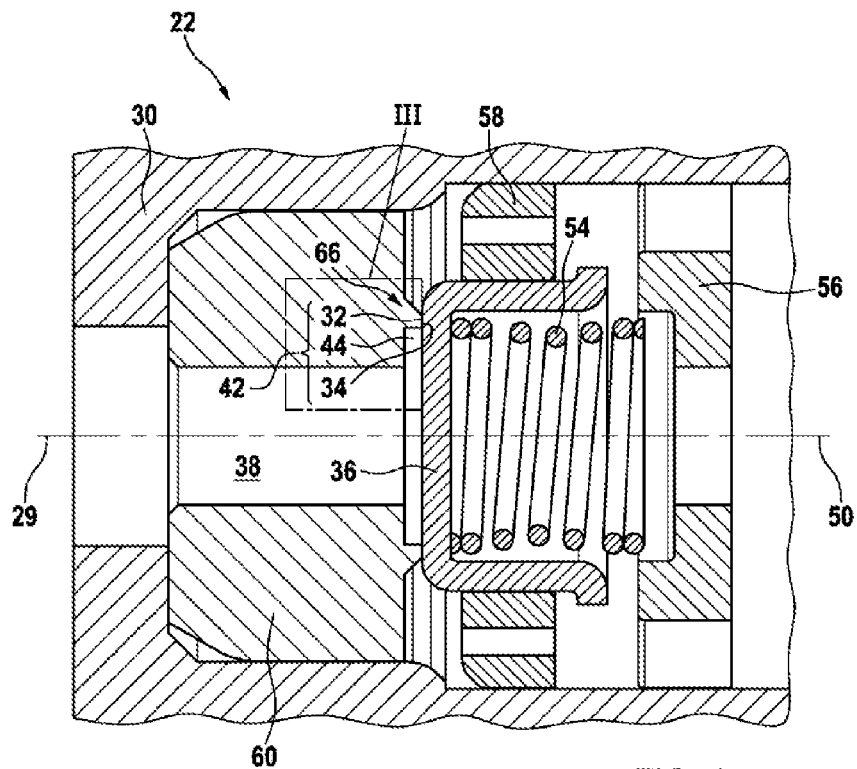
FIG. 2 shows a simplified sectional illustration of one embodiment of the valve device according to FIG. 1 in a closed state.

FIG. 2 shows one embodiment of the valve device 22 according to FIG. 1 in a simplified sectional illustration. The elements of the valve device 22 which are shown in the drawing are configured substantially rotationally symmetrically about a longitudinal axis 29 and comprise a housing 30 with a sealing seat 32, against which a sealing section 34 of a valve body 36 bears when the valve device 22 is closed.

Upstream of the sealing seat 32, the valve device 22 has a flow duct 38 which extends parallel to the longitudinal axis 29.

The sealing seat 32 and the sealing section 34 are configured flatly and parallel to one another and together form a sealing region 42. A decaying space 44 is formed upstream of the sealing region 42 and downstream of the flow duct 38 by means of a step-like recess in the housing 30, which decaying space 44 is delimited by a deflector wall 46 which extends at a right angle from the sealing region 42 or its plane and by a boundary wall 48 which is at an angle, in particular perpendicularly, with respect to the deflector wall 46.

The boundary wall 48 extends perpendicularly with respect to a movement axis 50, along which the valve body 36 can be moved for opening and closing the valve device 22. The movement axis 50 and the longitudinal axis 29 are preferably parallel to one another and, in particular, identical to one another.

A fluid, in particular fuel, first of all flows within the flow duct 38 substantially parallel to the longitudinal axis 29 and is then deflected radially to the outside upstream of the valve body 36. The deflection of the flow takes place comparatively prematurely and with low loss by means of the hydraulic action of the decaying space 44 downstream of an edge 52 which delimits the flow duct 38 on the end side.

Moreover, the valve device 22 comprises a valve spring 54 which loads the valve body 36 with a closing force. The valve spring 54 is supported on a supporting element 56 which is connected to the housing 30 or is configured in one piece with the latter.

In order to guide the valve body 36 along the movement axis 50, a guide element 58 is provided which is connected to the housing 30 or is configured in one piece with the latter.

The flow duct 38, the decaying space 44 and/or the sealing seat 32 can be formed by the housing 30 or, as shown in FIG. 2, by a housing insert 60 which is connected fixedly to the housing 30.

Figure 3:
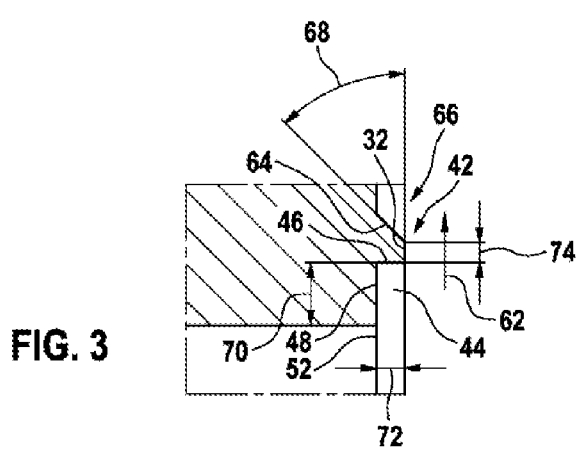
FIG. 3 shows a detail in enlarged illustration which is denoted by III in FIG. 2.

In an open state of the valve device 22, fluid, in particular fuel, flows in the sealing region 42 in a fluid flow direction 62 (cf. FIG. 3). The sealing seat 32 is adjoined on that side of the sealing seat 32 which faces away from the deflector wall 46 by a flow guiding face 64.

The deflector wall 46, the sealing seat 32 and the flow guiding face 64 together form a housing-side projection 66. The flow guiding face 64 is inclined relative to the fluid flow direction 62 by an angle 68 of from 0° to 90°, preferably of from approximately 10° to approximately 80°, in particular of from approximately 20° to approximately 70°.

The boundary wall 48 is preferably of annular disk-shaped configuration and has a length 70 which is measured in the radial direction.

The deflector wall 46 is hollow-cylindrical and is preferably concentric with respect to the movement axis 50 of the valve body 36. The deflector wall 46 has a length 72 which is measured parallel to the movement axis 50 of the valve body 36.

The sealing seat 32 is preferably of annular disk-shaped configuration and has a length 74 which is measured in the radial direction.

The length 70 of the boundary wall 48 is greater than the length 72 of the deflector wall 46. For example, as shown in FIG. 2, the length 70 is greater than the length 72 by a factor of from 2 to 3.

The length 70 of the boundary wall 48 is preferably greater than the length 74 of the sealing seat. For example, as shown in FIG. 2, the length 70 is greater than the length 74 by a factor of from 2 to 3.

If, as shown in FIG. 2, the valve body 36 bears with the sealing section 34 against the sealing seat 32, a fluid flow is interrupted. In an end region of the flow duct 38, vapor bubbles (not shown in the drawing) can form upstream of the valve body 36 in the flow direction during the operation of the fuel system 10, which vapor bubbles are produced on account of cavitation effects as a consequence of pressure pulses. The vapor bubbles bear with a comparatively large area against the valve body 36 or are at least closely adjacent with respect to the latter.

During the implosion of vapor bubbles of this type, the load which is produced in the process is distributed to a relatively large area of the valve body 36 or the deflector wall 46 and the boundary wall 48 which is parallel to the sealing section 34 of the valve body, as a result of which the cavitation erosion is reduced considerably. In particular, the valve device 22 has no constricting (wedge-like) spatial sections in the surroundings of the vapor bubbles, which spatial sections are particularly susceptible to cavitation erosion.

The invention claimed is:

1. A valve device, comprising:
   a housing;
   a flow duct;
   a valve body arranged in the flow duct, the valve body having a sealing section configured to bear against a housing-side sealing seat when the valve device is closed;
   a guide element connected to the housing and configured to guide the valve body along a movement axis of the valve body; and
   a housing insert fixedly connected to the housing,
   wherein:
   the sealing section and the sealing seat together form a sealing region,
   a decaying space is defined in the flow duct immediately upstream of the sealing region when the valve device is closed,
   the decaying space is delimited by a boundary wall, which is at least substantially perpendicular with respect to a movement axis of the valve body and by a deflector wall which is arranged at an angle with respect to the boundary wall,
   the boundary wall is longer than the deflector wall,
   the sealing seat is adjoined on a side opposite the boundary wall by a flow guiding face, which is at least partially inclined in relation to a fluid flow direction prevailing in the sealing region when the valve device is open,
   the defector wall, the sealing seat and the flow guiding face together form a housing-side projection, and
   the flow duct, the decaying space, and the sealing seat are all defined by the housing insert.

2. The valve device as claimed in claim 1, wherein the boundary wall is at least 1 mm longer than the deflector wall.

3. The valve device as claimed in claim 1, wherein the boundary wall is longer than the deflector wall by a factor of at least 1.2.

4. The valve device as claimed in claim 1, wherein the boundary wall is annular disk-shaped.

5. The valve device as claimed in claim 1, wherein the deflector wall is hollow-cylindrical.

6. The valve device as claimed in claim 1, wherein the flow guiding face is inclined in relation to the fluid flow direction by at least 10°.

7. The valve device as claimed in claim 1, wherein the flow guiding face is inclined in relation to the fluid flow direction by at most 90°.

8. A high pressure pump of a fuel system of an internal combustion engine, the high pressure pump comprising:
   an outlet valve for discharging fuel from a delivery space of the high pressure pump, the outlet valve configured as a valve device, including:
   a housing;
   a flow duct;
   a valve body arranged in the flow duct, the valve body having a sealing section configured to bear against a housing-side sealing seat when the valve device is closed;
   a guide element connected to the housing and configured to guide the valve body along a movement axis of the valve body; and
   a housing insert fixedly connected to the housing,
   wherein:
   the sealing section and the sealing seat together form a sealing region,
   a decaying space is defined in the flow duct immediately upstream of the sealing region when the valve device is closed,
   the decaying space is delimited by a boundary wall, which is at least substantially perpendicular with respect to the movement axis of the valve body, and by a deflector wall, which is arranged at an angle with respect to the boundary wall,
   the boundary wall is longer than the deflector wall,
   the sealing seat is adjoined on a side opposite the boundary wall by a flow guiding face, which is at least partially inclined in relation to a fluid flow direction prevailing in the sealing region when the valve device is open,
   the defector wall, the sealing seat and the flow guiding face together form a housing-side projection, and
   the flow duct, the decaying space, and the sealing seat are all defined by the housing insert.

9. The valve device as claimed in claim 2, wherein the boundary wall is at least 2 mm longer than the deflector wall.

10. The valve device as claimed in claim 2, wherein the boundary wall is at least 3 mm longer than the deflector wall.

11. The valve device as claimed in claim 3, wherein the boundary wall is longer than the deflector wall by a factor of at least 1.5.

12. The valve device as claimed in claim 4, wherein the boundary wall is concentric with respect to the movement axis of the valve body.

13. The valve device as claimed in claim 5, wherein the deflector wall is concentric with respect to the movement axis of the valve body.

14. The valve device as claimed in claim 6, wherein the flow guiding face is inclined in relation to the fluid flow direction by at least 20°.

15. The valve device as claimed in claim 7, wherein the flow guiding face is inclined in relation to the fluid flow direction by at most 70°.

16. The valve device as claimed in claim 1, wherein the housing, housing insert, and guide element are separate structures.

\* \* \* \* \*

UNITED STATES PATENT AND TRADEMARK OFFICE
CERTIFICATE OF CORRECTION

PATENT NO. : 10,054,092 B2
APPLICATION NO. : 14/443748
DATED : August 21, 2018
INVENTOR(S) : Kleindl et al.

Page 1 of 1

It is certified that error appears in the above-identified patent and that said Letters Patent is hereby corrected as shown below:

In the Claims

In Column 5, Lines 25-37, Lines 18-30 of Claim 1 should read:
the decaying space is delimited by a boundary wall, which
    is at least substantially perpendicular with respect to the
    movement axis of the valve body, and by a deflector
    wall, which is arranged at an angle with respect to the
    boundary wall,
the boundary wall is longer than the deflector wall,
the sealing seat is adjoined on a side opposite the bound-
    ary wall by a flow guiding face, which is at least
    partially inclined in relation to a fluid flow direction
    prevailing in the sealing region when the valve device
    is open,
the deflector wall, the sealing seat and the flow guiding
    face together form a housing-side projection, and Signed and Sealed this
Twenty-sixth Day of March, 2019

Andrei Iancu
*Director of the United States Patent and Trademark Office*